R. L. WILCOX.
THREADING DIE.
APPLICATION FILED MAY 17, 1919.
Reissued Nov. 18, 1919.
14,759.
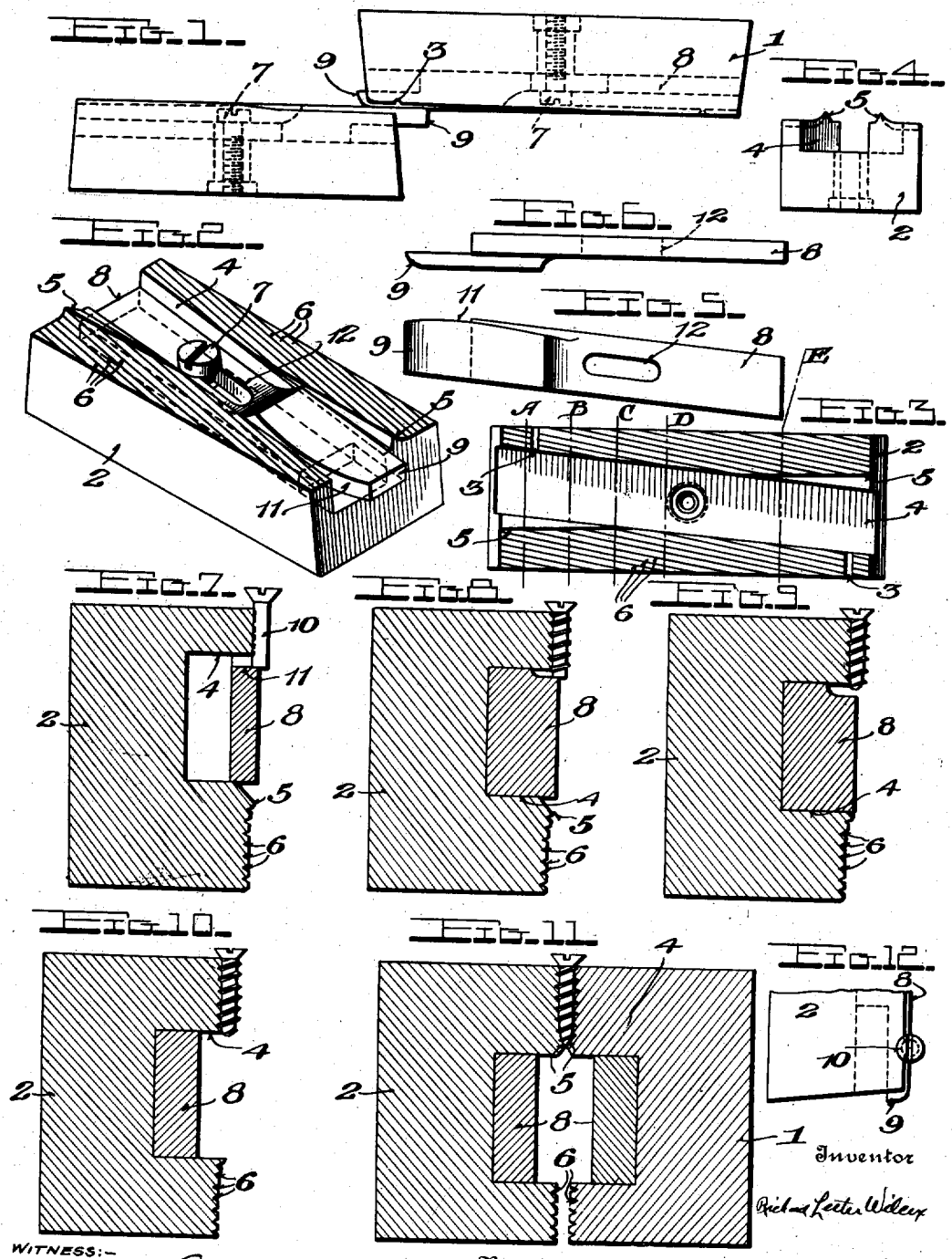
Inventor
Richard Lester Wilcox
WITNESS:-
Chas. R. Grieshauer
Florence H. Monk
By
George E. Fraey
Attorney

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

THREADING-DIE.

14,759. Specification of Reissued Letters Patent. Reissued Nov. 18, 1919.

Original No. 1,232,875, dated July 10, 1917, Serial No. 46,940, filed August 23, 1915. Application for reissue filed May 17, 1919. Serial No. 297,946.

*To all whom it may concern:*

Be it known that I, RICHARD L. WILCOX, a citizen of the United States, residing at Waterbury, in the county of New Haven and State of Connecticut, have invented certain new and useful Improvements in Threading-Dies, of which the following is a specification, reference being had therein to the accompanying drawings.

My invention relates to a new and improved die for pointing and threading screws, bolts and similar articles.

It is the object of my invention, among other things, to produce such dies, economically designed to be interchangeable, reversible, and attachable to any one of the many forms of thread rolling machines now in common use.

The invention further resides in the provision of a gage for the threading die to facilitate the positioning of the blanks and to guide the latter with respect to the die.

To these, and other ends, my invention consists in the threading dies, substantially as hereinafter described and illustrated in the accompanying drawing, wherein, Figure 1 is a plan view of a pair of thread rolling dies embodying my invention and occupying the relative positions assumed by them at the commencement of the thread rolling operation;

Fig. 2 is a perspective view of one of the dies;

Fig. 3 is a face view thereof with the depth gage removed;

Fig. 4 is an end view thereof;

Fig. 5 is a face view of the depth gage;

Fig. 6 is an edge view thereof;

Figs. 7, 8, 9, 10 and 11 are enlarged sectional views of the die and depth gage, taken respectively upon lines A, B, C, D, and E of Fig. 3, with the blank shown in connection therewith;

Fig. 12 is a fragmentary plan view of one of the dies and depth gage with the blank in contact therewith.

Heretofore gimlet point screws have been produced by first pointing the blank in a shaving machine, lathe or similar mechanism and afterward forming the thread thereon, but in my improved method the blanks are pointed and threaded at one and the same time and without the loss of any material, as is necessary under the old practice.

In the drawings, the numeral 1 designates the fixed die and 2 the movable die, both being of substantially the same shape, differing only in their length, the fixed die being longer than the movable die and provided with a guide notch 3.

These dies are secured in the usual way in any one of the common forms of thread rolling machine. Each die has an angle recess 4 in one side thereof at an angle to the top and bottom and upon the adjacent faces are the ribs 5, which are parallel to the side of the dies and terminate at their inner ends at the edge of the recess 4.

The front face of each of the dies is provided with the usual thread rolling grooves 6, which extend from the outer edges of the die to and upon one side of the ribs 5 (see Fig. 2).

Secured within the recess 4, by a screw 7, is the depth gage 8, having the lip 9 upon one end thereof. The depth gage 8 is so shaped and designed that its position within the recess 4 may be reversed end for end if desired, and which is necessary if the dies are reversed so that the lower side becomes the top side and vice versa.

The contact face 11 of the lip 9 is slightly curved to allow for the elongation of the blank as the end thereof passes over it.

The dies 1 and 2 are so arranged that the ribs 5 upon one die move in the same plane as the ribs 5 upon the opposite die and the edges thereof have substantial contact with each other during this movement.

In practice, the blank, designated herein by the numeral 10, is placed between the dies in the usual manner, with the bottom end thereof resting upon the contact face 11 of the lip 9, its alinement being determined by the guide notch 3, and its then position being substantially shown in Fig. 12. The guide notch 3 is not essential to the operation of the device but is common in thread rolling dies.

The engagement of the blank with the gage determines the position of the blank and guides the travel thereof between the faces of the dies during the initial part of the thread rolling operation. If the depth of entry of the blank is to be decreased, the gage 8 is moved outwardly, and vice versa, for a greater depth.

As the movable die 1 advances parallel with the face of the fixed die 2, the thread is rolled upon the shank of the blank from the head down to a point near the bottom thereof, there being no grooves 6 at this point to form the threads, see Figs. 7 and 8. As the threads are rolled, the blank is slightly elongated by stretching toward its bottom end, the engagement of the rolled threads and grooves 6 preventing elongation in the opposite direction, until the threads are substantially completed and the blank is at that part of the die substantially designated by the line C in Fig. 3 and as illustrated in Fig. 9. At about this time the lower end of the blank is brought into contact with the ribs 5 and the elongated portion thereof is tapered by reason of its contact therewith and is pointed substantially as shown in Fig. 11. During this pointing operation the grooves in the side of the ribs 5 roll the thread on the screw until the completed blank is formed at that portion of the die substantially illustrated by line E in Fig. 3, and in Fig. 11.

The blank is only supported by the lip 9 of the depth gage 8 until such time as the threads on the shank are of sufficient depth to insure the proper alinement of the blank in the die, and after this, has been accomplished, the blank passes beyond the lip 9, as shown in Fig. 9, and there is nothing to retard the elongating action of the blank through the thread rolling operation. This elongation of the blank continues while the thread is being rolled on the pointed portion, thus facilitating the pointing operation.

If the metal in the blank is of such a nature that it will not flow by reason of the thread rolling operation, the blank is placed between the dies for substantially its full length, instead of slightly shorter, as is the case with the blank composed of metal capable of flowing freely.

It will be observed that in the embodiment of my invention, as herein described, gimlet pointed screws or bolts are pointed and threaded without waste of material, and the old pointing operation wherein material is wasted is eliminated.

In minor details my new and improved threading dies may be altered and I do not therefore limit myself to a die constructed exactly as shown and described except as the scope of the claims requires.

Having described my invention, what I claim as new and desire to secure by Letters Patent, is:

1. In combination, a thread rolling die, having a grooved face and a projecting rib upon said face, and a depth gage movably connected with said die.

2. In combination, a thread rolling die, having a grooved face and a projecting rib upon said face, said grooves extending into one side of said rib; and a depth gage movably connected with said die.

3. A thread rolling die, having a recess in the face thereof, ribs upon said die adjacent to said recess, thread rolling grooves in the face of said die adjacent to said recess and extending into one side of said rib, in combination with a depth gage mounted in said recess.

4. A thread rolling die, having an inclined recess in the face thereof; a rib upon the face of said die upon each side of said recess and at an angle thereto; thread rolling grooves in said face adjacent to said recess and extending into one side of each of said ribs, in combination with a depth gage mounted in said recess.

5. A thread rolling die, having a recess in the face thereof; ribs upon said face adjacent to said recess and shorter than the die, thread rolling grooves in said face adjacent to said recess and extending into one side of each of said ribs, in combination with a depth gage mounted in said recess.

6. A thread rolling die, having a recess in the face thereof, ribs upon said face adjacent to said recess, thread rolling grooves in said face adjacent to said recess and extending into one side of each of said ribs, in combination with a depth gage mounted in said recess, said depth gage having a projecting lip thereon.

7. A thread rolling die, having a recess in the face thereof, ribs upon said face adjacent to said recess, thread rolling grooves in said face adjacent to said recess and extending into one side of each of said ribs, in combination with a depth gage mounted in said recess, said depth gage having a projecting lip thereon with one curved edge.

8. A thread rolling die, having a recess in the face thereof; ribs upon said face adjacent to said recess and shorter than the die, thread rolling grooves in said face adjacent to said recess and extending into one side of each of said ribs, in combination with a depth gage mounted in said recess; and means for adjustably securing said depth gage to said die.

9. A thread rolling die having a recess in one face thereof, the side wall of which is at an angle to the side of the die, a rib upon said face adjacent to said side wall, thread rolling grooves in said face adjacent to said recess and extending into one side of said rib, in combination with a depth gage mounted in said recess.

10. A thread rolling die, having a recess in the face thereof, ribs upon said face adjacent to said recess, thread rolling grooves in said face adjacent to said recess and extending into one side of each of said ribs, in combination with a depth gage mounted in said recess, said depth gage having a projecting lip thereon that is shorter than the length of said die.

11. The combination of thread rolling dies and a gaging device connected therewith lying between the operating faces of the dies for positioning the blank when between said faces, said dies and gaging device forming a structure capable of being placed in position in a thread rolling machine and taken therefrom as a unit.

12. The combination of thread rolling dies and a gaging device connected therewith and movably held between the operating faces of said dies for positioning a blank between said faces, said dies and gaging device forming a structure capable of being placed in position in a thread rolling machine and taken therefrom as a unit.

13. The combination of thread rolling dies and a movable gaging device connected therewith for preparatory positioning of a blank in a predetermined position with respect to the dies and guiding said blank during a part of a thread rolling operation, said dies and gaging device forming a structure capable of being placed in position in a thread rolling machine and taken therefrom as a unit.

14. The combination with a thread rolling die; of a gaging device connected therewith for preparatory positioning of a blank in a predetermined position relatively to the die and maintaining such position during the initial part of a thread rolling operation, said dies and gaging device forming a structure capable of being placed in position in a thread rolling machine and taken therefrom as a unit.

15. The combination with a threading die having a recess longitudinally in the operating face thereof; of a gage located within said recess.

16. The combination with a threading die having a longitudinal recess in the operating face thereof; of a gage in said recess; and means for adjustably securing said gage to said die.

17. The combination of a threading die having an angularly disposed longitudinal recess in one face thereof; and a gage within said recess.

18. The combination with a threading die having a longitudinal recess therein; an operating face at each side of said recess; and a gage in said recess capable of being reversibly mounted therein.

19. In combination, a pair of thread rolling dies, each of said dies having a longitudinal recess along the operating face thereof; a gage in each recess having a portion thereof projecting beyond the face of the dies and serving as a depth gage in the preparatory positioning of the blank within said dies and guiding the blank during its transit between said dies.

20. A gage for threading rolling dies having a substantially straight body portion; and a raised offset lip portion at one end thereof.

21. An adjustable device for positioning a blank within threading dies, comprising a member having a substantially straight body portion; a raised projection extending longitudinally from said body portion and having one edge tapered toward the end thereof.

RICHARD LESTER WILCOX.